Dec. 21, 1926.
J. O. CARREY
1,611,266
MOTOR MOUNTING
Filed April 12, 1923
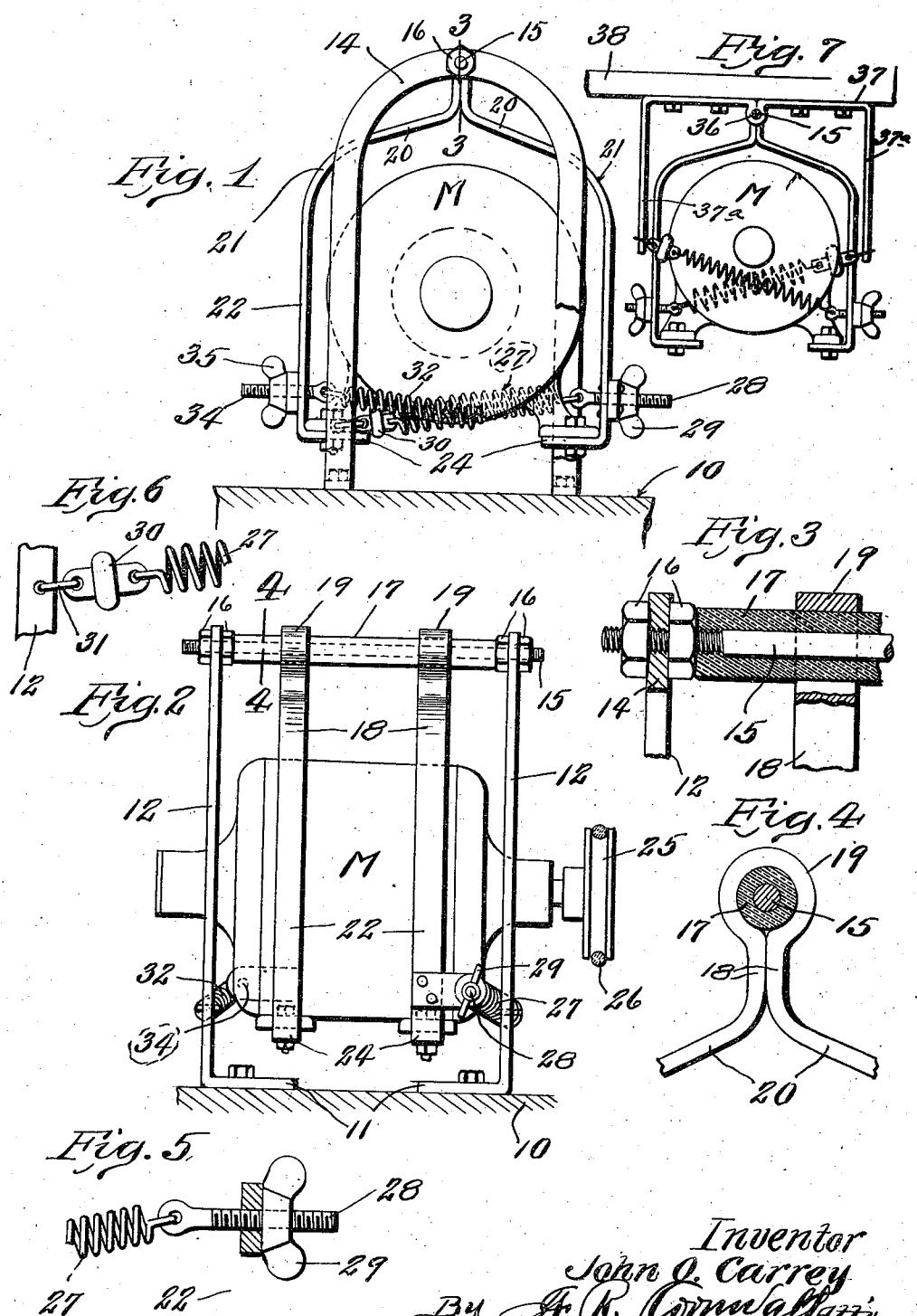
Inventor
John O. Carrey Patented Dec. 21, 1926.

1,611,266

UNITED STATES PATENT OFFICE.

JOHN O. CARREY, OF ST. LOUIS, MISSOURI, ASSIGNOR TO CARREY-MORSE ENGINEERING COMPANY, OF ST. LOUIS, MISSOURI, A CORPORATION OF MISSOURI.

MOTOR MOUNTING.

Application filed April 12, 1923. Serial No. 631,568.

My invention relates to new and useful improvements in motor mountings and the objects of the invention are to provide simple and durable means for mounting motors, dynamos and the like and in which the vibration of the mounting and parts associated therewith is reduced to a minimum, thereby eliminating objectionable noises and enabling me to utilize the mounting for supporting motors used in connection with player-pianos, refrigerating machines and other household appliances or for supporting electric generators on car trucks.

Further objects of the invention are to provide a mounting for a motor or dynamo which successfully absorbs all the vibration produced by the same and which insulates the motor or dynamo from its support thereby preventing accidental grounding of the electric circuits.

With these and other objects in view my invention consists in certain novel features of construction and arrangement of parts hereinafter more fully described and claimed, and illustrated in the accompanying drawings, in which—

Figure 1 is an end elevation showing the mounting used in connection with an electric motor.

Figure 2 is a side elevation of the same.

Figure 3 is a vertical cross section taken on line 3—3 of Figure 1.

Figure 4 is a vertical cross section taken on line 4—4 of Figure 2.

Figure 5 is a fragmental detail view showing the means for connecting the springs to the motor suspension members.

Figure 6 is a fragmental detail view showing the means for connecting the other end of the spring to the stationary support.

Figure 7 is an end elevational view of a modified form of mounting especially adapted for supporting a dynamo in position on a car truck.

Referring by numerals to the accompanying drawings, 10 indicates a platform to which are fixed the lower ends 11 of stationary supports 12 which are spaced from each other a suitable distance to accommodate a motor M. Stationary supports 12 are arranged in pairs and the upper ends of each pair are united by a curved portion 14 and seated in said portions and spaced a suitable distance upwardly from motor M are the ends of a rod 15. These ends are preferably threaded and receive nuts 16 which are designed to lock said rod in position on said supports.

A sleeve 17 formed of insulating material and preferably of resilient nature is arranged on rod 15 between supports 12. A pair of suspension members 18 is arranged between supports 12 and each member is provided at its upper end with a loop portion 19 which engages sleeve 17 and swingingly supports said member in position. A short distance below rod 15 the legs of members 18 diverge outwardly as indicated at 20 and then curve downwardly as at 21 so that the straight vertically disposed portions 22 are spaced a suitable distance away from motor M. The extremities of portions 22 are bent inwardly and occupy horizontal positions as indicated at 24 and form supports to which is fixed the base of motor M. Thus the motor M is supported in position by members 18 which are suspended from rod 15 carried by the stationary supports 12 and the motor will have the tendency to occupy a central position relative to supports 12.

One end of the shaft of motor M carries a pulley 25 over which operates a belt 26 and in order to maintain this belt under proper tension I employ a coiled spring 27, one end of which is adjustably fixed by means of a threaded rod 28 and a butterfly nut 29 to one of the members 18 and the opposite end of said spring is anchored to an insulator 30 which insulator is connected by a link 31 to one of the supports 12. By turning butterfly nut 29 in the proper direction spring 27 is tensioned so that belt 26 maintains proper operative relation with belt pulley 25 of motor M.

In order to prevent twisting of motor M due to the tension of the belt and the spring applied to one end thereof, I provide a small spring 32 which is oppositely disposed relative to spring 27 and partially counteracts said spring and balances the motor. This spring is connected at one end to threaded rod 34 which is adjustably held in position on member 18 by means of a butterfly nut 35 and the opposite end of said spring is connected to the stationary member 12 in the same manner as spring 27.

Members 18 are freely suspended from rod 15 which form a one-point support for the motor and the motor is yieldingly held in its proper operative position by means of springs 27 and 32. Sleeve 17 being made of insulation material and the ends of the springs being connected to the stationary supports 12 by means of insulators 30, the motor is completely insulated from supports 12 and platform 10 and all danger of grounding or short-circuiting of the motor is thereby eliminated. The divergent portions 20 are resilient and the diameter of rod 15 is such as to provide a resilient support and sleeve 17 is preferably made of resilient or yielding material whereby all vibration produced by the running motor is absorbed by members 18 and sleeve 17 and rod 15, thus providing a quiet driving means which is especially adapted for use in homes.

In the form illustrated in Figure 7, the rod 15 is supported in loops 36 formed integral with supports 37 which are secured to a car underframe 38. Supports 37 are provided with downward extensions 37ª to which are connected the spring insulators.

A motor mounting of my improved construction is simple and inexpensive to manufacture and can be easily attached in position, and the resilient members of the motor support efficiently absorb all vibration and the coil springs provide adjustable means for yieldingly holding the motor against displacement and serve to prevent the transmission of vibration from the motor to the stationary supports.

While I have shown and described the different forms of my invention, it is obvious that various changes in the construction and arrangement of parts of my device may be made and substituted for those herein shown and described without departing from the spirit and scope of my invention.

I claim:

1. A mounting for motors and the like comprising a stationary support, a horizontally disposed member secured to said support, and axially aligned inverted U-shaped members pivotally suspended from said horizontally disposed member and having spaced depending legs adapted to operatively support therebetween a motor and the like.

2. A mounting of the class described comprising a stationary frame, a horizontally disposed member secured to said frame, inverted U-shaped members pivotally suspended from said horizontally disposed member in axial alignment with each other and having portions spaced from and straddling the motor, the ends of said portions being disposed below said motor and adapted to support the same, and spring means for adjusting the operative position of said motor.

3. A mounting of the class described comprising stationary supports, a horizontally disposed resilient rod secured at its ends to said supports, and inverted U-shaped pieces pivotally suspended at their apices from said rod and having their ends adapted to receive and support a motor.

4. A mounting for electrical devices comprising a stationary support, a horizontally disposed rod secured to said support, an insulation sleeve on said rod, and a pair of resilient suspension members pivotally arranged on and insulated from said rod and adapted to receive and support an electrical device, the pivotal point of said members being in vertical plane with the axis of said motor.

5. A mounting for electrical devices comprising stationary members, a horizontally disposed member secured thereto, a pair of inverted U-shaped pieces pivotally suspended from said member and insulated therefrom for supporting a suitable electrical device, springs connected to said U-shaped pieces for yieldingly maintaining said electrical device in operative position, and means for insulating said springs from said stationary members.

6. A mounting for motors and the like comprising stationary members, a horizontally disposed rod fixed at its ends to said members, a sleeve of vibration absorbing material arranged on said rod, and a pair of coaxially aligned suspension members supported on said sleeve and pivotally suspended from said rod for receiving and supporting a motor and the like, said suspension members being of inverted U-shape with the legs thereof spaced from said motor and disposed transversely to the axis thereof.

7. A mounting for motors and the like comprising stationary supports, a horizontally disposed resilient rod fixed at its ends to said supports, an insulation sleeve arranged on said rod, resilient suspension members arranged on said sleeve and adapted to receive and support a motor and the like, said suspension members being arranged transversely to the axis of the motor, and counterbalanced spring means for adjusting the position of said suspension means.

In testimony whereof I hereunto affix my signature this 2nd day of April, 1923.

JOHN O. CARREY.